(12) United States Patent
Perlick et al.

(10) Patent No.: US 6,529,389 B2
(45) Date of Patent: Mar. 4, 2003

(54) UNIVERSAL INPUT MINIATURE POWER SUPPLY WITH A SINGLE SPLIT TRANSFORMER PRIMARY WINDING

(75) Inventors: John A. Perlick, Eden Prairie, MN (US); Gary W. Box, Golden Valley, MN (US)

(73) Assignee: Aria Corporation, Eden Prairie, MN (US)

( * ) Notice: Subject to any disclaimer, the term of this patent is extended or adjusted under 35 U.S.C. 154(b) by 0 days.

(21) Appl. No.: 10/009,418

(22) PCT Filed: Apr. 5, 2001

(86) PCT No.: PCT/US01/11027
§ 371 (c)(1),
(2), (4) Date: Dec. 5, 2001

(87) PCT Pub. No.: WO01/78091
PCT Pub. Date: Oct. 18, 2001

(65) Prior Publication Data
US 2002/0159214 A1 Oct. 31, 2002

Related U.S. Application Data
(60) Provisional application No. 60/195,034, filed on Apr. 6, 2000, and provisional application No. 60/196,537, filed on Apr. 11, 2000.

(51) Int. Cl.[7] ................................................. H02M 1/10
(52) U.S. Cl. .......................................... 363/20; 363/142

(58) Field of Search ....................... 363/16, 200, 21.01, 363/21.04, 21.12, 71, 131, 142, 143

(56) References Cited

U.S. PATENT DOCUMENTS

| | | | |
|---|---|---|---|
| 5,045,769 A | | 9/1991 | Everett .......................... 320/2 |
| 5,414,610 A | * | 5/1995 | Brainard ....................... 363/21 |
| 5,502,430 A | | 3/1996 | Takahaski et al. ........... 336/232 |
| 5,534,839 A | | 7/1996 | Mackin et al. ................. 336/92 |
| 5,583,474 A | | 12/1996 | Mizoguchi et al. ............ 336/83 |
| 5,754,088 A | | 5/1998 | Fletcher et al. ............. 336/200 |
| 5,940,282 A | * | 8/1999 | Oglesbee ...................... 363/21 |
| 5,949,321 A | | 9/1999 | Grandmont et al. ......... 336/332 |
| 6,069,548 A | | 5/2000 | Baarman et al. ............... 336/65 |
| 6,100,664 A | | 8/2000 | Oglesbee et al. ............ 320/125 |
| 6,137,697 A | * | 10/2000 | Tarodo et al. ................. 363/71 |
| 6,144,276 A | | 11/2000 | Booth .......................... 336/61 |
| 6,208,531 B1 | | 3/2001 | Vinciarelli et al. ............ 363/21 |

* cited by examiner

Primary Examiner—Jeffrey Sterrett
(74) Attorney, Agent, or Firm—Vidas, Arrett & Steinkraus P.A.

(57) ABSTRACT

A transformer connected to a power source, which consists of a primary coil, a secondary coil and a magnetic core, the secondary coil being configured to provide a regulated DC output voltage and/or current. The primary coil contains two portions, one portion being used to operate the transformer as a low voltage input converter and both portions being used when the transformer is used as a high voltage input converter.

12 Claims, 8 Drawing Sheets

UNIVERSAL INPUT MINIATURE POWER SUPPLY WITH A SINGLE SPLIT TRANSFORMER PRIMARY WINDING

CROSS-REFERENCE TO RELATED APPLICATIONS

This application is a continuation-in-part of provisional patent applications No. 60/195,034 filed Apr. 6, 2000 and No. 60/196,537, filed Apr. 11, 2000, the entire contents of which are hereby incorporated by reference.

STATEMENT REGARDING FEDERALLY SPONSORED RESEARCH

Not Applicable

BACKGROUND OF THE INVENTION

This application related to miniaturized power supplies and battery chargers. In particular this application discloses an inventive transformer and inventive control element which permit the manufacture of smaller and lower cost AC/DC power supplies and battery chargers.

The use of planar transformers is well known in the art. See for example the following patents:
- U.S. Pat. No. 5,502,430
- U.S. Pat. No. 5,754,088;
- U.S. Pat. No. 5,949,321;
- U.S. Pat. No. 6,069,548;
- U.S. Pat. No. 6,144,276;
- U.S. Pat. No. 6,208,531.

Patents related to miniature transformers and miniature power supplies and battery chargers are also known in the art. See for example the following patents:
- U.S. Pat. No. 5,534,839, and
- U.S. Pat. No. 6,100,664.
- U.S. Pat. No. 6,208,531 is related to a power converter having magnetically coupled control.

None of the prior art provides a power supply/battery charger which has a universal input which accepts a DC input of between 10–30 VDC or an AC input of between 85 VAC to 265 VAC and between 50–60 Hz and provides a regulated DC output voltage or current; which utilizes a planar transformer; which provides a programmable control which allows the device to work with any battery chemistry, as well as a variable power source such as a solar cell; which eliminates the need for bulky hold up capacitors; which matches the impedance of the power source and the impedance of the load, and which can be electrically isolated using magnetic isolation.

For the purpose of this disclosure, all U.S. patents and patent applications and all other publications referenced herein are incorporated herein by reference in their entirety.

SUMMARY OF THE INVENTION

Applicant has invented a miniature power supply and battery charger with a universal input, so that it functions as a universal power module. The inventive device is connected to a power source, which can be AC or DC, which is connected to a transformer, which consists of a primary coil, a secondary coil and a magnetic core, the secondary coil being configured to provide a regulated DC output voltage and/or current. A control circuit is electrically connected to the power source for controlling first and second FET's electrically connected to the control circuit, the first FET being electrically connected to an upper portion of the primary coil such that when the first FET is activated only the upper portion of the primary coil is utilized in the transformer, the second FET being electrically connected to a lower portion of the primary coil such that when the second FET is activated the entire primary coil is utilized in the transformer. The control circuit is configured to detect the input voltage of the power source and above a predetermined threshold voltage activate the second FET so that the power module operates as a high voltage input converter and below the predetermined threshold voltage activate the first FET so that the power module operates as a low voltage input converter.

The inventive universal power module utilizes an inventive planar transformer design which contributes to its miniature size. The inventive planar transformer includes a triple insulated primary winding formed into a planar coil, and a secondary winding formed on a printed circuit board (PCB). The triple insulated primary winding and secondary winding are sandwiched between upper and lower magnetic core material, the triple insulated primary winding and secondary windings being in physical contact with each other. The use of the triple insulated primary winding provides safety isolation.

The control element includes a battery module circuit consisting of a primary control circuit and a DC/DC converter for monitoring and maintaining the charge on a secondary battery. The primary control circuit regulates the input power and is connected to a DC/DC converter which produces a regulated DC current used to charge the battery. The primary control circuit has three input lines for programming the primary control circuit, and the DC/DC converter having three input lines for programming the DC/DC converter. As few as a single wire could be used for programming, however three lines are standard using the JTAG standard.

The control circuit can also include a switch mode power supply which is configured with an inventive circuit to track the voltage of a rectified cycle of the AC input source. This permits the elimination of bulky hold up capacitors, thereby aiding in the miniaturization of the device.

The control circuit can also include an inventive source impedance matching circuit which includes a charger electrically connected to a power source and a battery, and a control circuit which ramps up the current from the power source until the load impedance of the charger is matched to the impedance of the power source.

The control circuit can also be programmably constructed and arranged so that the DC output voltage and/or current of the universal power module may be programmably set by the user. This allows the device to be utilized with different types of batteries, on the fly.

Further miniaturization is permitted by using a high current low loss diode connected to the secondary coil of the transformer. The high current low loss diode includes first and second high current, low on-resistance power MOSFETS electrically connected between an input and an output. A control circuit electrically connected to the first and second MOSFETS which turns off the first and second MOSFETS when the voltage on the output is higher than the voltage on the input and which turns on the first and second MOSFETS when the voltage on the input is higher than the voltage on the output.

The transformer utilized in the inventive device uses an inventive construction to further reduce the size. The transformer uses a bobbin having opposite sides. PCB support pins extend from each of the opposite sides of the bobbin, first and second windings are located on each of the opposite sides of the bobbin, and a core is attached to the bobbin. Two PCB's are attached to the PCB support pins, one PCB on each side of the bobbin. The windings may be located either around the support pins or on the PCB's themselves.

The inventive universal power module can also be electrically isolated, with the primary coil of the transformer being housed in a paddle and the secondary coil being housed in a mating receptacle. In this manner a load device is electrically connected to the secondary coil and electrically isolated from the power source.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE DRAWINGS

While this invention may be embodied in many different forms, there are described in detail herein a specific preferred embodiment of the invention. This description is an exemplification of the principles of the invention and is not intended to limit the invention to the particular embodiment illustrated.

Figure 1:
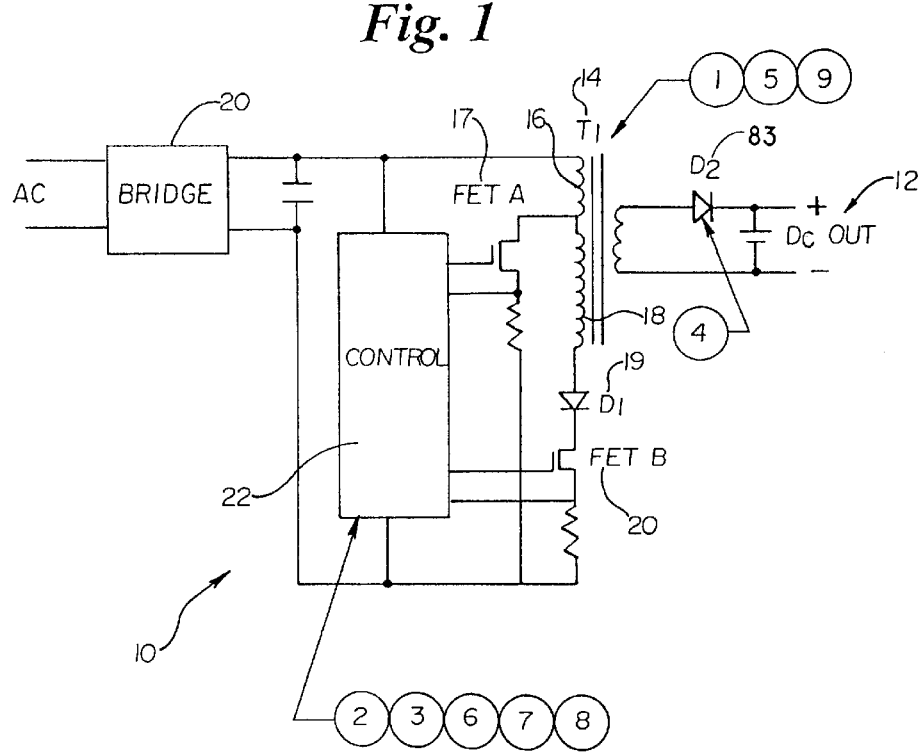
FIG. 1 is a circuit schematic of the inventive miniaturized AC/DC power supply and battery charger.

Referring now to FIG. 1, a circuit schematic of the inventive miniaturized AC/DC power supply and battery charger is shown generally at 10 which allows either a DC input of between 10–30 VDC or an AC input of between 85 VAC to 265 VAC and between 50–60 Hz and provides a regulated DC output voltage at 12. The power supply and battery charger 10 utilizes a transformer with a tapped primary T1, shown at 14. The tap is arranged so that the upper portion of the primary coil 16 has the correct number of turns and magnetic performance to operate as a low voltage input DC/DC converter using FET A, shown at 17. The entire primary coil, consisting of both upper portion 16 and lower portion 18 is constructed to have the correct number of turns and magnetic performance to operate as a high voltage input AC/DC converter using FET B, shown at 20. When operated as a low voltage DC/DC converter, a high negative voltage is induced on the lower terminal of the transformer primary. Diode 19 blocks this high negative voltage from damaging FET B.

A control element 22 is connected to both FET A 17 and FET B 20. As will be discussed further below, the programmability of the control element 22, along with the dual fed primary configuration of the power transformer allows this inventive miniaturized AC/DC power supply and battery charger to convert a wide range of input voltage (10–30 VDC or an AC input of between 85 VAC to 265 VAC and between 50–60 Hz) to a wide range of output voltage and current. The conversion can be performed to provide a constant output DC voltage, so the circuit can function as a power supply; programmable output current so the circuit can function as a battery charger, or constant power so the circuit can function as either a power supply or charger running off of a solar cell.

Figure 2:
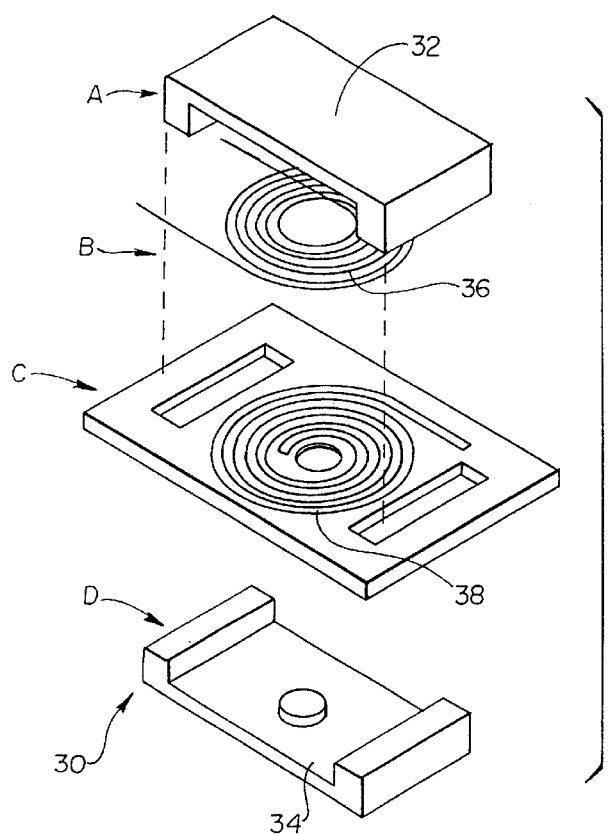
FIG. 2 is an exploded perspective view of an inventive planar transformer used in the inventive miniaturized AC/DC power supply and battery charger.

Referring now to FIG. 2, the tapped primary 14 of FIG. 1 is comprised of a hybrid planar transformer shown generally at 30, in which 32 and 34 are two halves of a flat transformer core. The core material is ferrite or powdered iron for high frequency response. The primary winding is shown at 36 and is a flat coil with the wire being triple insulated with three layers of high voltage breakdown insulation material to maintain a high insulation between the primary winding 36 and the secondary winding 38. The primary coil is varnished or glued so that it will hold its wound coil flat shape. The secondary winding 38 is traced on the PCB layers and multiple secondary windings 38 may be provided on multi layer PCB's, as is well known in the art. The advantage of having only the secondary winding(s) on a PCB is the small size of the transformer, which the triple insulated primary winding provides for full safety isolation between primary and secondary without the need for creepage and clearance distances. The use of the inventive planar transformer contributes to the miniaturization of the device of FIG. 1.

Figure 3:
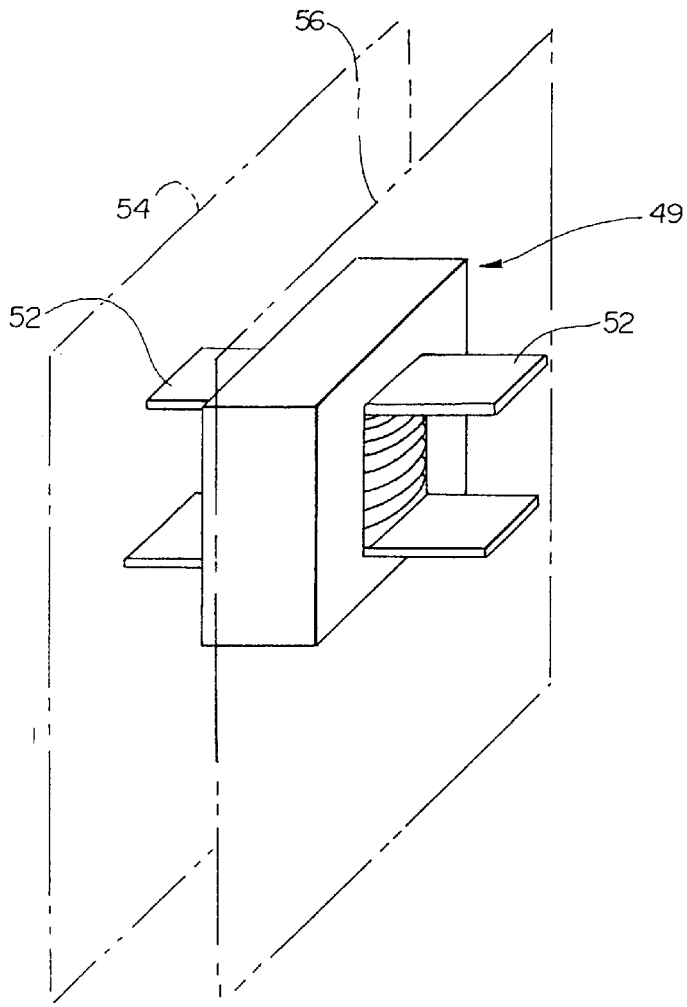
FIG. 3 is a perspective view of an alternate embodiment of the planar transformer.
Figure 4:
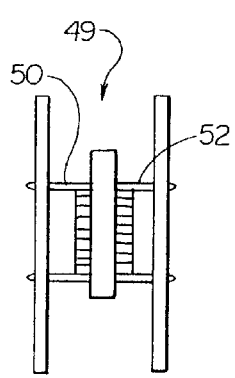
FIG. 4 is a side view of the alternate embodiment of FIG. 4.
Figure 5:
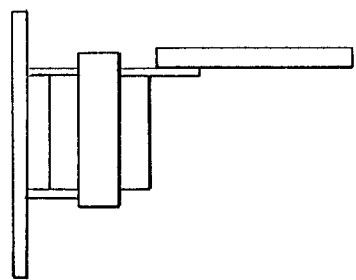
FIG. 5 is a side view of an alternate embodiment of the embodiment of FIG. 3.

Referring now to FIGS. 3–5, several alternate embodiments of the planar transformer are shown. FIG. 3 shows a bobbin 49 having PCB support pins 50 and 52 extending from each opposing face of the bobbin. The primary and secondary windings are wound around the bobbin, one to each side and the core of the transformer is than attached to the bobbin around the windings. Two PCB's 54 and 56 are soldered to the support pins 50 and 52. The circuitry associated with the primary winding is located on circuit board 54 and the circuitry associated with the secondary winding is located on circuit board 56. FIG. 5 shows a right angle embodiment of FIG. 3. Building the transformer between two PCB's reduces the overall package size and footprint, contributing to the miniaturization of the device of FIG. 1.

Figure 6:
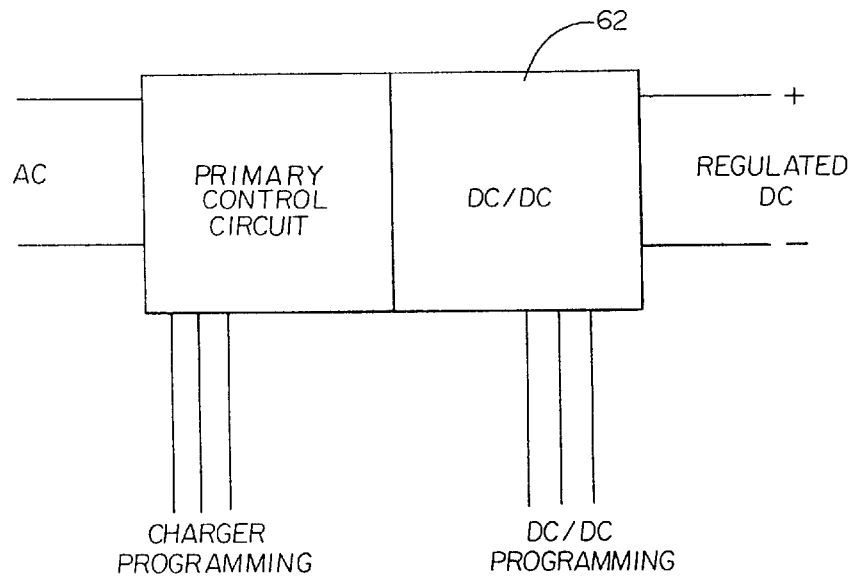
FIG. 6 is a block diagram showing an inventive battery module for use with the circuit of FIG. 1.

Referring now to FIG. 6, a battery module is shown at 60, which is incorporated as part of the control element 22 of FIG. 1. The battery module is used as an intelligent charger to monitor and maintain the charge on a secondary battery and can be programmed for any battery chemistry desired. A DC/DC converter 62 provides power from the primary control circuit to the battery for charging. A secondary battery such as a lead acid or cadmium sulfide battery is provided (not shown). Battery charge requirements are either factory programmed or provided to the primary control circuit via a JTAG serial data stream; a serial EEPROM or a PWM signal. The DC/DC converter is then programmed to the desired output voltage and current using resistors, a JTAG or other serial data stream, serial EEPROM or a PWM signal. The power line, battery and DC/DC converter status and control are available through the serial data stream.

Figure 7:
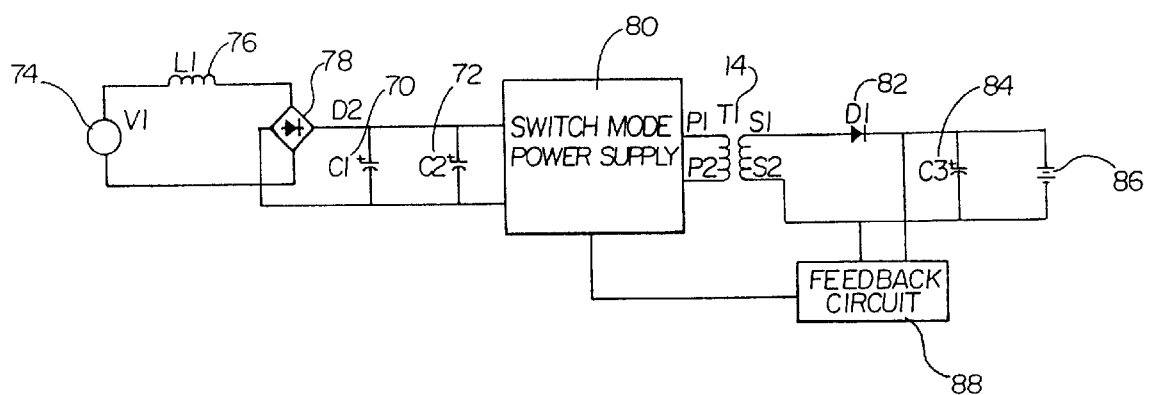
FIG. 7 is a circuit schematic of an inventive battery charger circuit which allows for the elimination of bulky "hold up" capacitors in the circuit of FIG. 1.
Figure 8:
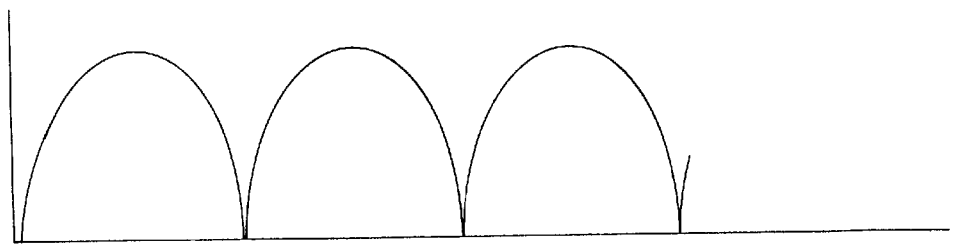
FIG. 8 shows a rectified sine wave waveform produced by the circuit of FIG. 7 without large capacitor 70.
Figure 9:
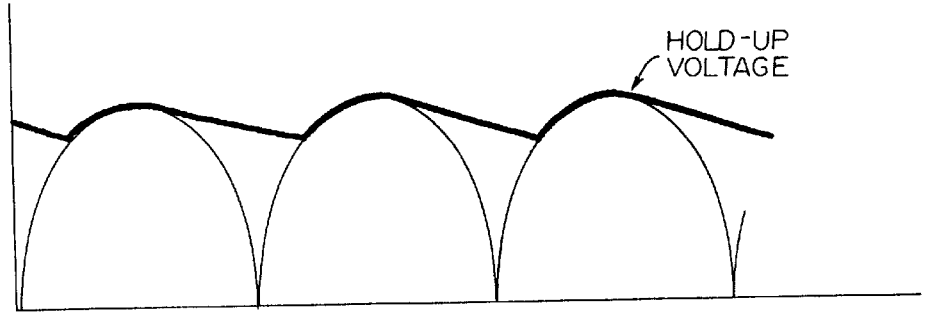
FIG. 9 shows the waveform with large capacitor 70 in the circuit.

Referring now to FIGS. 7–10 a circuit is shown which allows for the elimination of large and bulky hold-up capacitor(s) between the bridge 20 of FIG. 1 and the transformer 14. The circuit shown in FIG. 7 allows the control element 22 to follow the rectified cycle of the AC line. The circuit of FIG. 7 is shown with prior art hold-up capacitors C1 (large) 70 and C2 (small) 72, but it should be understood that the use of the circuit of FIG. 7 allows for the elimination of the large C1 capacitor. Hold-up capacitors C1 and C2 are well known in the art to fiction to "hold up" the DC voltage to a nearly constant value rather than rectified sine waves, shown in FIG. 8. This "hold up" voltage is shown in FIG. 9. The AC input source 74 is filtered with L1 76 and rectified with either a half wave or full wave diode bridge 78 to produce a DC voltage consisting of a rectified sine waves, shown in FIG. 8. Without the hold up capacitor 70, the voltage of FIG. 8 drops nearly to zero at 60 or 120 Hz. This voltage is then applied to a switch-mode power supply (SMPS) 80. SMPS 80 chops the input voltage at a high rate, such as 10 kHz or higher, and applies this chopped voltage (or in the dual case the chopped current) to the primary of the transformer 14. The secondary output of the transformer is a representation of the chopped current waveform from the primary. The secondary output of the transformer is rectified with diode 82 and filtered with capacitor 84. This voltage is then applied to the battery 86 to recharge it.

Figure 10:
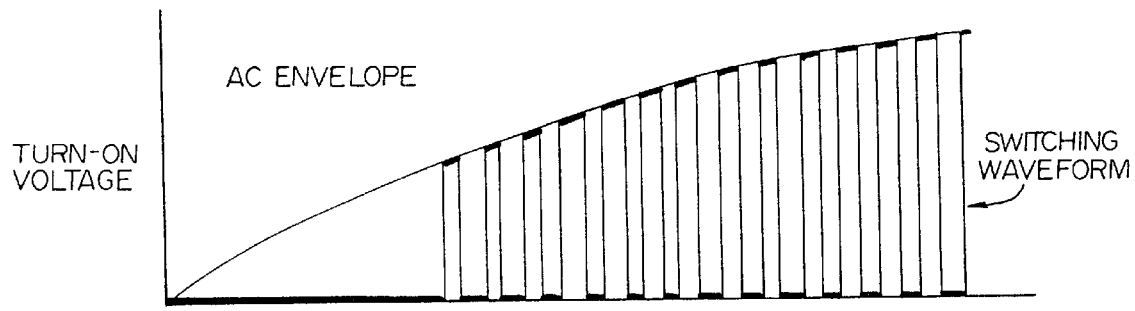
FIG. 10 shows the output of the SMPS of FIG. 7.

The SMPS 80 applies current pulses to the primary of the transformer as shown in FIG. 10. Each pulse is much shorter in time duration as compared to the 60 or 120 Hz input voltage. The SMPS can efficiently transfer power to the secondary circuit and therefore to the battery 86 by this high frequency switching action through the transformer. In addition, this circuit allows for the input and output voltages to be significantly different (e.g., a 120 VAC source can charge a 12 VDC battery) by adjusting the turns ratio of the transformer 14.

The SMPS 80 turns on or starts switching when the rectified DC input voltage across 72 increases beyond a predetermined "turn on" voltage. Conversely, when the input voltage drops below the "turn on" voltage, the SMPS will stop switching. When the input voltage to SMPS 80 is between these two points is idle and is not transferring any power to the battery. The SMPS is turning off and on at either 60 or 120 Hz, which results in the battery charge current being small bursts of current at either 60 or 120 Hz rates.

A sample of the output voltage is measured with a feedback circuit 88 and is used to control the operation of the SMPS, as is well known in the art. When the battery voltage indicates a full charge the SMPS is turned off until it is necessary to recharge the battery.

Because the battery offers low impedance to the output of the SMPS, is possible to significantly reduce the value of C3 84 and allow averaging of output current pulses to occur in battery 86. Elimination of the bulky hold up capacitor 70, which is often the largest component in a battery charger contributes to a reduction in the size and weight of the overall package and cost of the battery charger.

Figure 11:
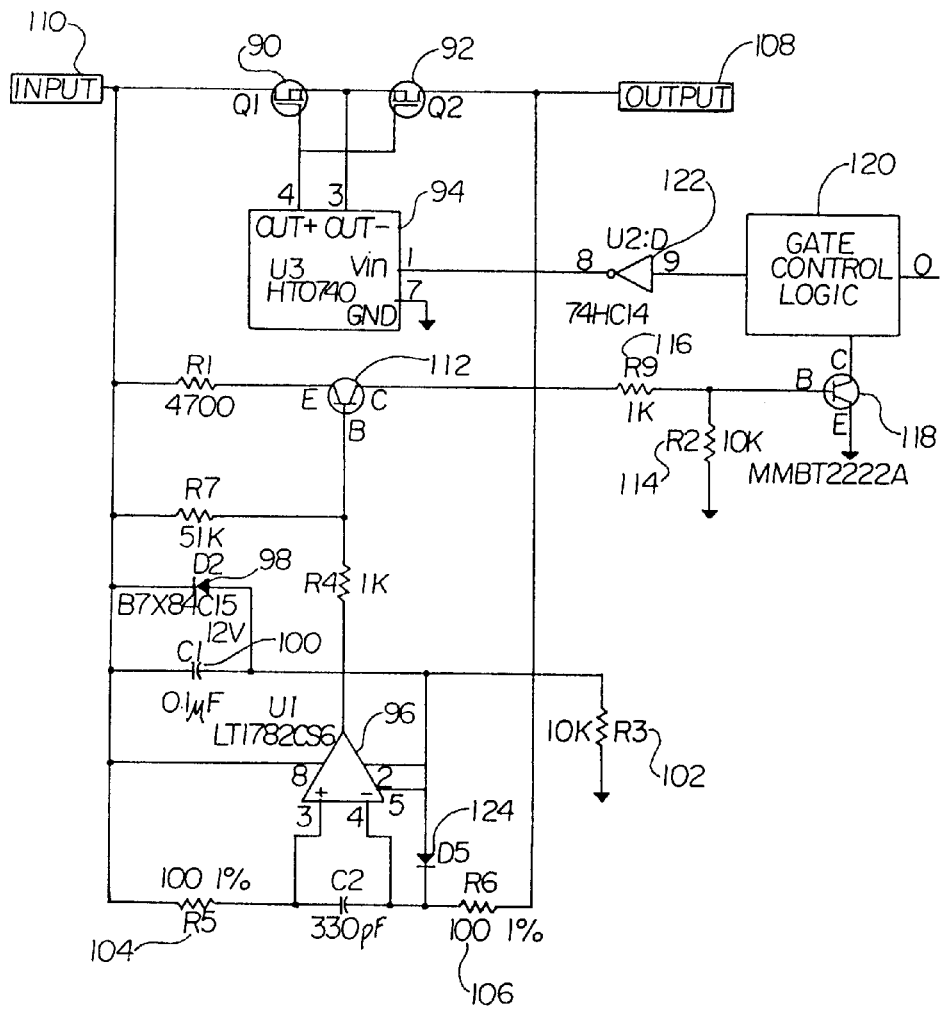
FIG. 11 is a circuit schematic for an inventive high current low loss diode used in connection with the circuit of FIG. 1.

FIG. 11 is directed to a high current low loss diode circuit used at 82 in FIG. 1, which provides for a very high efficiency and therefore smallest size output diode. The circuit of FIG. 11 allows for high currents to pass through transistors 90 and 92 with much lower losses than if a conventional Schottkey diode were used as 82 in FIG. 1. Like a semiconductor diode, current will flow only when the input voltage is greater than the output voltage, and not visa versa. Transistors 90 and 92 are high current, low on-resistance power MOSFETs. 94 is an isolated power MOSFET gate drive circuit, such as model HT0740. 96 is an operational amplifier IC that is capable of sensing input voltages above and beyond its power (VCC) terminals, such as the LT1782 available from Linear Technologies. The use of both transistors 90 and 92 shuts off current in both directions when these transistors are turned off. A simplified alternative version of this circuit would eliminate the gate 94 and transistor 92, which would then shut off current in the reverse direction, as in a conventional diode.

In the circuit, 98, 100 and 102 provide a Zener-regulated power source for the operational amplifier. The voltage across 96 is 12 Volts. Op-amp 96 senses the voltage drop across 90 and 92 through resistors 104 and 106. If the voltage on the output 108 is higher than the voltage on the input 110, then the output of the Op-amp 96 will go to a low voltage (near to the voltage on the anode of D2). This will turn on the PNP transistor 112, causing current to flow through resistors 114 and 116 and turning on the NPN transistor 118. Transistors 112 and 118 act as level shifters giving a ground referenced output signal, which is further processed in the gate control logic element 120 and is also used to turn off 90 and 92 through 122 and 94.

If the voltage on the input 110 is greater than the voltage on the output 108, then the output of Op-amp 96 will swing high, which will shut off 112, which will in turn shut off 118. This will cause 120 to turn on MOSFET gates 90 and 92 via 122 and 94. The use of the gate control logic 120 is not required by using the output of either transistors 112 or 118 to drive 94. As described above, elimination of the gate also allows the elimination of transistor 92.

Diode 124 provides protection of the input to 96 in the event the input voltage to the MOSFET 90 is greater than the safe operating level of the Op-amp 96. Depending on the operating levels of the circuit, diode 124 may not be necessary.

The inventive circuit of FIG. 11 operates as an "ideal diode" where the semiconductor diode behavior is achieved with little loss, and using this diode as circuit element 82 in FIG. 1 helps contribute to the overall miniaturization of the inventive power supply.

Figure 12:
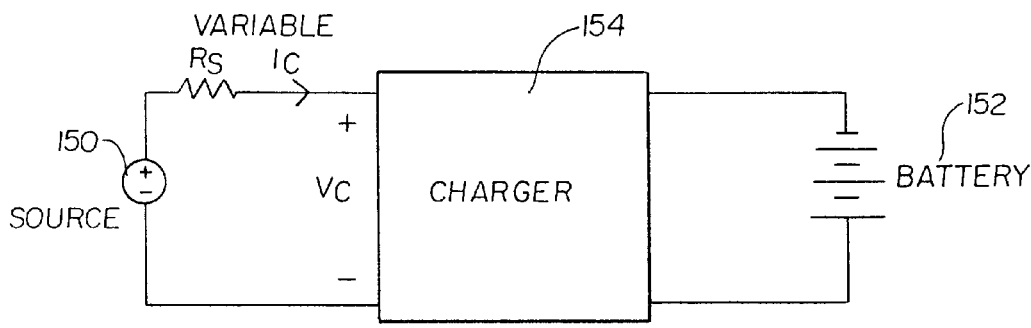
FIG. 12 is a circuit schematic for an inventive source impedance matching battery charger used in connection with the circuit of FIG. 1.
Figure 13:
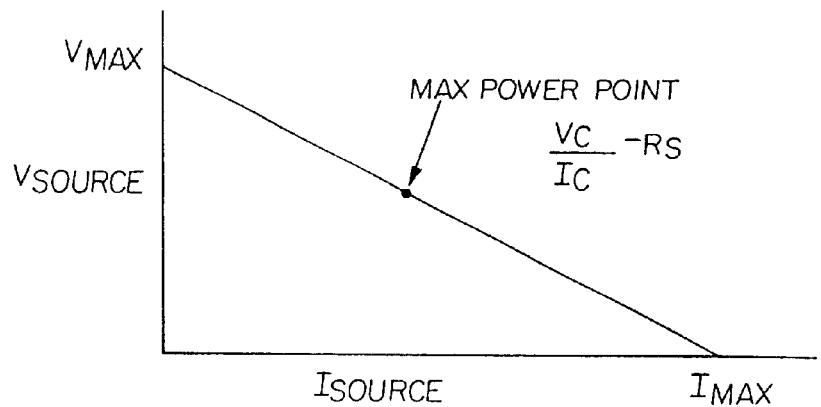
FIG. 13 is a graph showing the impedance matching of the circuit of FIG. 12.

Referring now to FIGS. 12 and 13, an inventive source impedance matching battery charger circuit is shown which is utilized in control 22 of FIG. 1. This circuit will allow either an AC/DC or DC/DC battery charger track the output impedance of a power source 150, such as a solar cell and provide charging of a battery 152 at a voltage other than the optimum output voltage of the source 150. This circuit also provides battery charge management. A wide input voltage range power module is used as an intelligent charger 154, such as the circuit discussed above in connection with FIG. 6. Charger 154 monitors and maintains the charge on the secondary battery 152. The charger 154 can be programmed for any battery chemistry.

To use charger 154, the user provides a secondary battery 152, such as a lead acid or cadmium sulfide battery. The battery charge requirements are either factory programmed or provided through a JTAG or other serial data stream, or a serial EEPROM. Charger 154 then monitors the source voltage 150 and ramps up the current from the source until the load impedance of the source is matched, as shown in FIG. 13. Source 150, battery 152 and charging status and control are available through the serial data stream. This inventive circuit provides the advantage of complete, programmable battery charging for a portable or uninterruptable system from a variable impedance source such as a solar cell. The user need only add a secondary battery and provide programming information.

By using the inventive circuit of FIG. 12 in control 22 of FIG. 1, the control element 22 can be programmed to present a matched impedance to the power source impedance. This increases the efficiency of the battery charging process, particularly when charging from high impedance sources such as solar cells.

Figure 14:
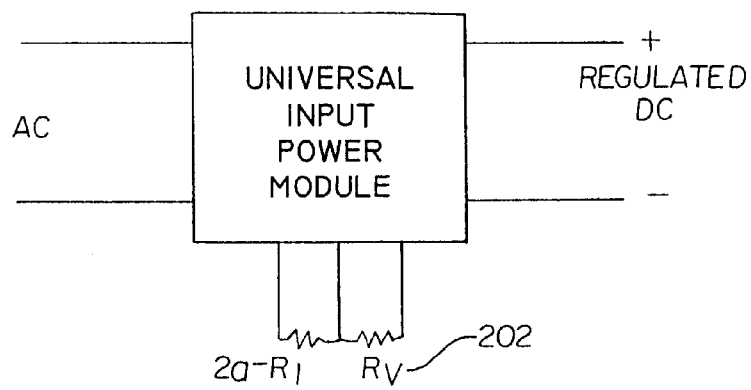
FIG. 14 shows resistor programming for an inventive user programmable power module.
Figure 15:
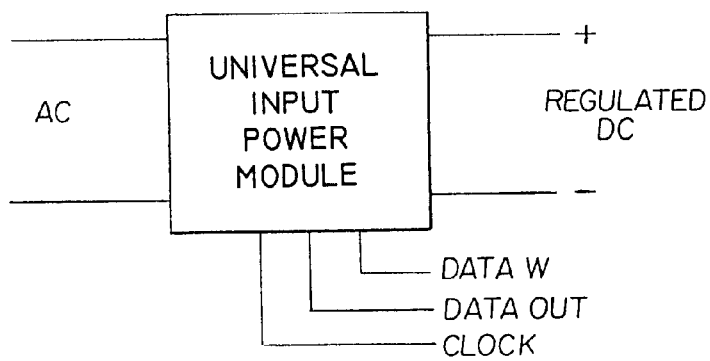
FIG. 15 shows serial programming for an inventive user programmable power module.
Figure 16:
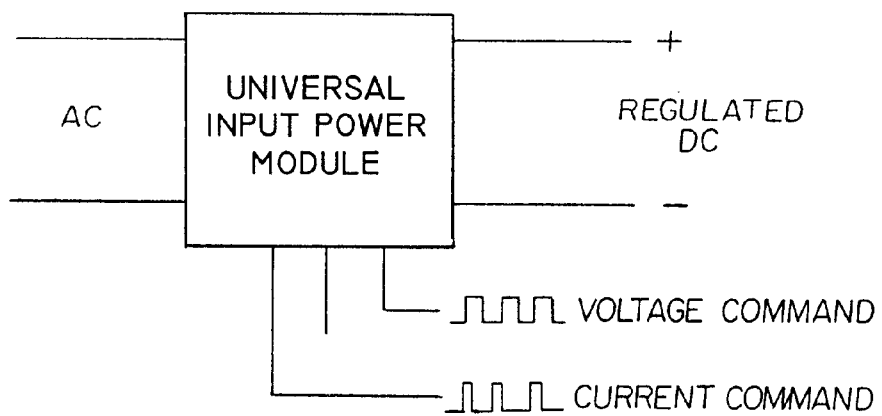
FIG. 16 shows PWM programming for an inventive user programmable power module.

Referring now to FIGS. 14–16 show a universal input power module, such as that shown in FIG. 1, that produces a DC output voltage that is programmable by the user. This capability could be programmed into control element 22 in a variety of ways. In addition to the connections to the AC line, three pins are provided for programming. A microcontroller inside the power module monitors these pins for programming information to set the output voltage and/or current of the module. FIG. 14 shows resistance programming, in which resistor 200 is used to set current and resistor 202 is used to set voltage. FIG. 15 shows serial programming in which a serial data stream conforming to JTAG or other industry standard is used to set the voltage and/or current. FIG. 16 shows PWM programming in which a first PWM signal is used to set voltage and a second PWM signal is used to set current. A combination of the above techniques could also be used, for example a combination of resistors and PWM programming.

This inventive circuitry can be programmed to accommodate line drops, temperature, time or humidity changes, or operational requirements such as power level or programming voltages. Since the settable voltages and current include zero, this feature can be used to turn the module on or off. Since both current and voltage are settable, the using assembly could throttle the power module to charge a battery using either analog or digital control. The use of this inventive programmable power module allows changing operation on the fly, such as accommodating several different types of batteries.

Figure 17:
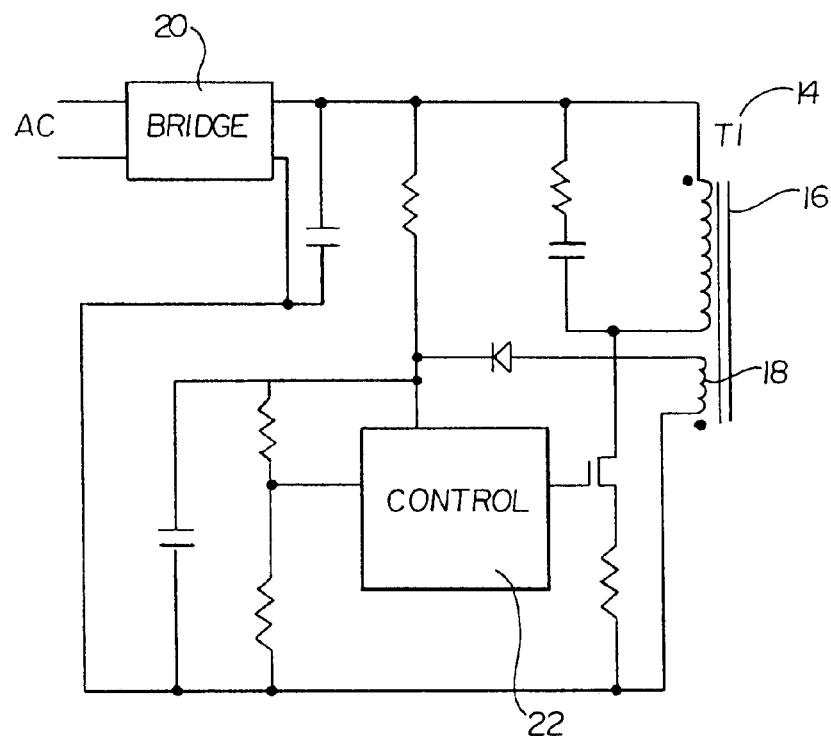
FIG. 17 shows a circuit schematic of an embodiment of the invention of FIG. 1 with a magnetically coupled power inlet.
Figure 18A:
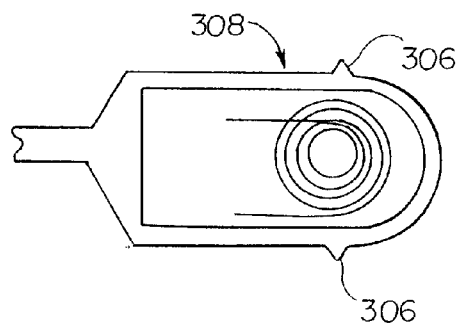
FIGS. 18a–d show several views of the paddle and receptacle of the inventive magnetically coupled power inlet of FIG. 17.
Figure 18B:
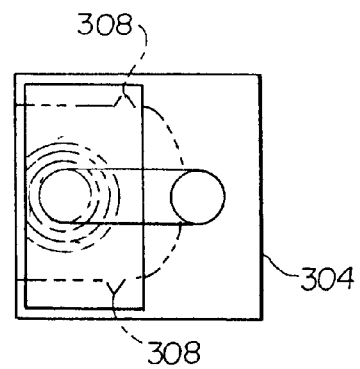
Figure 18C:
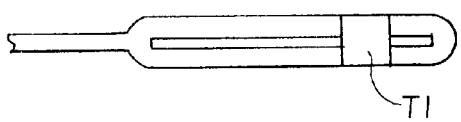
Figure 18D:
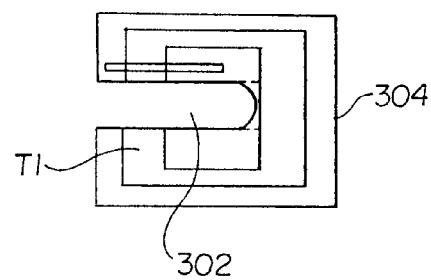
Figure 19:
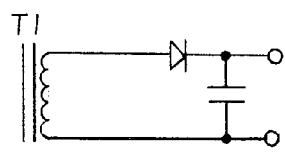
FIG. 19 shows a circuit schematic of the mating receptacle circuitry.

Referring now to FIGS. 17–19, an alternative embodiment of FIG. 1 is disclosed in which the primary portion of the transformer and associated circuitry is enclosed in a paddle (see FIG. 18) and the secondary portion of the transformer and associated circuity is enclosed in a receptacle (see FIG. 18). This inventive embodiment allows the transfer of energy using magnetic coupling, which provides a fully insulated connector.

The primary portion of the transformer is housed in paddle 300, which is designed to slide into slot 302 of receptacle 304. Paddle 302 removably locks into the receptacle 304 using detents 306 which lock with recesses 308. By magnetically coupling the paddle to the receptacle, the paddle can use any type of power source DC or AC to transfer energy to the load device, such as a battery connected to the circuitry of the receptacle 304 (see FIG. 19).

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed:

1. A universal power module comprising:

a power source;

a transformer comprised of a primary coil, a secondary coil and a magnetic core, the secondary coil being configured to provide a regulated DC output voltage and/or current;

a control circuit electrically connected to the power source for controlling first and second FET's electrically connected to the control circuit, the first FET being electrically connected to an upper portion of the primary coil such that when the first FET is activated only the upper portion of the primary coil is utilized in the transformer, the second FET being electrically connected to a lower portion of the primary coil such that when the second FET is activated the entire primary coil is utilized in the transformer;

the control circuit configured to detect the input voltage of the power source and above a predetermined threshold voltage activate the second FET so that the power module operates as a high voltage input converter and below the predetermined threshold voltage activate the first FET so that the power module operates as a low voltage input converter.

2. The universal power module of claim 1 wherein the transformer is a planar transformer, the planar transformer comprising:

a triple insulated primary winding formed into a planar coil;

a secondary winding formed on a PCB;

the triple insulated primary winding and secondary winding sandwiched between upper and lower magnetic core material, the triple insulated primary winding and secondary windings being in physical contact with each other.

3. The universal power module of claim 1 wherein the control circuit further includes a battery module circuit for monitoring and maintaining the charge on a secondary battery, the battery module comprising:

an ac power source connected to a charger, the charger connected to a DC/DC converter which produces a regulated DC voltage used to charge the battery;

the charger having three input lines for programming the charger, and the DC/DC converter having three input lines for programming the DC/DC converter.

4. The universal power module of claim 1 wherein the control circuit further includes a switch mode power supply which is configured to permit the use of a rectified cycle of the AC input source.

5. The universal power module of claim 1 further including a high current low loss diode connected to a secondary coil of the transformer, the high current low loss diode comprising:

first and second high current, low on-resistance power MOSFETS electrically connected between an input and an output;

a control circuit electrically connected to the first and second MOSFETS which turns off the first and second MOSFETS when the voltage on the output is higher than the voltage on the input and which turns on the first and second MOSFETS when the voltage on the input is higher than the voltage on the output.

6. The universal power module of claim 1 further including a high current low loss diode connected to a secondary coil of the transfomer, the high current low loss diode comprising:

a high current, low on-resistance power MOSFET electrically connected between an input and an output;

a control circuit electrically connected to the MOSFET which turns off the MOSFET when the voltage on the output is higher than the voltage on the input and which turns on the MOSFET when the voltage on the input is higher than the voltage on the output.

7. The universal power module of claim 1 wherein the transformer is a miniature transformer for use with printed circuit boards comprising:

a bobbin having opposite sides;

PCB support pins extending from each of the opposite sides of the bobbin;

first and second windings on each of the opposite sides of the bobbin, and a core attached to the bobbin.

8. The universal power module of claim 7 wherein the miniature transformer further includes two printed circuit boards, each attached to the PCB support pins extending from the opposite sides of the bobbin.

9. The universal power module of claim 8 wherein one of the PCB's contains circuitry for controlling the primary portion of the transformer and the other PCB contains circuitry for controlling the secondary portion of the transformer.

10. The universal power module of claim 1 wherein the control circuit further includes a source impedance matching battery charger circuit comprising:

a charger electrically connected to a power source and a battery;

a control circuit which ramps up the current from the power source until the load impedance of the battery is matched to the impedance of the power source.

11. The universal power module of claim 1 wherein the control circuit is programmably constructed and arranged so that the DC output voltage and/or current of the universal power module may be programmably set.

12. The universal power module of claim 1 wherein the primary coil of the transformer is housed in a paddle and the secondary coil is housed in a mating receptacle, so that a load device electrically connected to the secondary coil is electrically isolated from the power source.

\* \* \* \* \*